(12) United States Patent
Chang et al.

(10) Patent No.: US 10,884,956 B2
(45) Date of Patent: Jan. 5, 2021

(54) I/O BUS SHARED MEMORY SYSTEM

(71) Applicant: MACRONIX INTERNATIONAL CO., LTD., Hsinchu (TW)

(72) Inventors: Kuen-Long Chang, Taipei (TW); Ken-Hui Chen, Hsinchu (TW); Chin-Hung Chang, Tainan (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 79 days.

(21) Appl. No.: 15/215,439

(22) Filed: Jul. 20, 2016

(65) Prior Publication Data

US 2017/0109297 A1 Apr. 20, 2017

Related U.S. Application Data

(60) Provisional application No. 62/244,106, filed on Oct. 20, 2015.

(51) Int. Cl.
*G06F 13/16* (2006.01)
*G06F 13/42* (2006.01)

(52) U.S. Cl.
CPC ...... *G06F 13/1663* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 6,606,427 B1 * | 8/2003 | Graves | G02B 6/3849 385/17 |
| 6,782,468 B1 | 8/2004 | Nakazato | |
| 7,185,138 B1 * | 2/2007 | Galicki | H04L 49/15 710/316 |
| 7,822,936 B2 | 10/2010 | Bartley et al. | |

(Continued)

FOREIGN PATENT DOCUMENTS

CN 101681322 A 3/2010

OTHER PUBLICATIONS

Macronix, "MX25L6455E/MX25L12855E High Performance Serial Flash Specification" Datasheet—p. 23, Feb. 10, 2012, P/N: PM1467, Rev. 1.4, Macronix International Co. Ltd., 81 pgs.

(Continued)

*Primary Examiner* — Henry Tsai
*Assistant Examiner* — Christopher A Bartels
(74) *Attorney, Agent, or Firm* — Haynes Beffel & Wolfeld LLP

(57) ABSTRACT

A memory system has a plurality of memory devices coupled with a hub in discrete and shared port arrangements. A plurality of bus lines connect the plurality of memory devices to the hub, including a first subset of bus lines connected in a point-to-point configuration between the hub and a particular memory device, and a second subset of bus lines connected to all the memory devices in the plurality of memory devices including the particular memory device. Bus operation logic is configured to use the first subset of bus lines in a first operation accessing the particular memory device while simultaneously using the second subset of bus lines in a second operation accessing a different selected memory device of the plurality of memory devices.

19 Claims, 13 Drawing Sheets

(56) References Cited

U.S. PATENT DOCUMENTS

| | | | | |
|---|---|---|---|---|
| 8,135,881 B1* | 3/2012 | Obkircher | G06F 13/4291 | |
| | | | 710/3 | |
| 8,223,562 B2 | 7/2012 | Hung et al. | | |
| 8,677,100 B2 | 3/2014 | Kuo et al. | | |
| 8,826,048 B2* | 9/2014 | Wyatt | G06F 1/206 | |
| | | | 713/320 | |
| 9,032,113 B2* | 5/2015 | Conroy | G06F 1/12 | |
| | | | 710/22 | |
| 9,047,953 B2* | 6/2015 | Chen | G11C 16/0483 | |
| 9,690,650 B2* | 6/2017 | Liu | G06F 11/1044 | |
| 9,972,611 B2* | 5/2018 | Pappu | H01L 22/22 | |
| 9,995,785 B2* | 6/2018 | Pappu | H01L 25/0657 | |
| 10,056,155 B2* | 8/2018 | Pappu | G11C 29/16 | |
| 10,249,597 B2* | 4/2019 | Pappu | H01L 25/18 | |
| 10,484,361 B2* | 11/2019 | Pappu | G06F 11/30 | |
| 10,657,092 B2* | 5/2020 | Pappu | G06F 13/4234 | |
| 10,664,433 B2* | 5/2020 | Pappu | H04L 63/0245 | |
| 2008/0005434 A1* | 1/2008 | Lee | G06F 13/4291 | |
| | | | 710/110 | |
| 2011/0055370 A1* | 3/2011 | Kern | G06F 9/5083 | |
| | | | 709/224 | |
| 2012/0218412 A1* | 8/2012 | Dellantoni | G01C 21/3602 | |
| | | | 348/148 | |
| 2012/0240017 A1* | 9/2012 | Uchida | H04L 49/1515 | |
| | | | 714/821 | |
| 2014/0122833 A1* | 5/2014 | Davis | G06F 15/7803 | |
| | | | 712/29 | |
| 2015/0340071 A1* | 11/2015 | Chen | G11C 7/22 | |
| | | | 365/189.02 | |
| 2016/0077985 A1* | 3/2016 | Gostin | G06F 13/124 | |
| | | | 710/300 | |
| 2017/0052919 A1* | 2/2017 | Purcell | G06F 13/4022 | |
| 2017/0091108 A1* | 3/2017 | Arellano | G06F 12/0888 | |
| 2018/0096971 A1* | 4/2018 | Pappu | H01L 25/0657 | |
| 2018/0096979 A1* | 4/2018 | Pappu | H01L 22/32 | |

OTHER PUBLICATIONS

Macronix, "MX25L51245G 3V 512M-Bit CMOS MXSMIO (Serial Multi I/O) Flash Memory" Datasheet, Figure 37 p. 47 and Figure 38 p. 48, Feb. 18, 2016, P/N: PM2006, Rev. 1.3, Macronix International Co. Ltd., 134 pgs.

* cited by examiner

I/O BUS SHARED MEMORY SYSTEM

PRIORITY APPLICATION

This application claims the benefit of U.S. Provisional Patent Application No. 62/244,106 filed 20 Oct. 2015. The application is incorporated herein by reference.

BACKGROUND

Field of the Technology

The present technology relates to a memory system having multiple memory chips, and particularly relates to a memory system in which a memory chip is accessed using shared and discrete I/O buses.

Description of Related Art

As shown in FIG. 1, I/O pins of the plurality of memory chips 1, 2, and 3 are connected to the hub 4 (MCU/Controller chip) by shared bus lines 5. For the purposes of this description the term "bus" refers to a communication system that transfers data between bus nodes, including in the memory system example a hub (e.g., memory controller, microcontroller, or other bus node controlling operation of the memory devices) and memory chips. The bus includes the bus lines (physical layer connectors like wires, optical fiber, etc.), input/output circuits on the devices, and drivers on the devices that together implement a communication protocol.

In the shared bus lines configuration of FIG. 1, the hub 4 is limited by the single bus structure having eight bus lines I/O 0~7, and typically cannot address different operations to different ones of the memory chips 1, 2, and 3 simultaneously. Rather the I/O circuits on all the memory chips see the same eight bus lines, sense the same commands, data and addresses on the shared bus lines, and react to chip select signals or priority logic to designate the active device. For instance, using a typical memory bus like the serial peripheral interface SPI bus, the hub 14 cannot program data into memory chip 1 and read out data from memory chip 2 simultaneously.

As shown in an alternative design of FIG. 2, to simultaneously access multiple memory chips, instead of shared bus lines, each of the plurality of memory chips 1, 2, and 3 is separately connected to the hub via discrete sets of bus lines 11, 12, and 13, each set in this example including eight lines I/O A0~A7, B0~B7, M0~M7. The discrete bus lines are connected in this configuration to particular memory chips in point-to-point connections with the hub.

For high transfer rates, the buses need to include a number of bus lines. So, for high transfer rate memory systems having a large number of memory devices, the discrete bus lines configuration raises the memory system cost, enlarges the memory system size due to increasing pin counts and bus line counts.

It is desirable to provide a new memory bus configuration to simultaneously access multiple memory chips, while refraining from overly enlarging the memory system size.

SUMMARY

A memory system is described having a plurality of memory devices coupled with a hub, like a memory controller, in discrete and shared arrangements of bus lines. A plurality of bus lines connect the plurality of memory devices to the hub, including a first subset of discrete bus lines connected in a point-to-point configuration between the hub and a particular memory device, and a second subset of shared bus lines connected to all the memory devices in the plurality of memory devices including the particular memory device. Bus operation logic executed at the hub includes logic to use the bus line configurations for operations accessing the memory devices in a variety of combinations.

In one example, the bus operation logic executed in the hub is configured to use the first subset of bus lines in a first operation accessing the particular memory device while simultaneously using the second subset of bus lines in a second operation accessing a different selected memory device of the plurality of memory devices.

The plurality of bus lines can be disposed so that (i) the first subset of bus lines are configured for point-to-point connections to a particular memory device, and (ii) the second subset of bus lines are configured for connections to a plurality of memory devices including the particular memory device. The plurality of bus lines can also include (iii) a third subset of bus lines configured for connections to more than one of the plurality of memory devices excluding the particular memory device.

Some of the combinations of bus operation logic are configured to use the first subset of bus lines in a first operation accessing the particular memory device while using the second subset of bus lines in a second operation accessing a different selected memory device of the plurality of memory devices, where the first operation overlaps in time with the second operation, and is configured to use at least one bus line in the second subset and at least one bus line in the first subset in a third operation accessing the particular memory device.

In another combination, the bus operation logic is configured to use at least one bus line in the first subset of bus lines for the first operation, and to use at least one bus line in the second subset of bus lines and at least one bus line in the third subset of bus lines for the second operation.

In yet other combinations, the bus operation logic is configured to use at least one bus line in the first subset of bus lines and at least one bus line in the third subset of bus lines for a fourth operation accessing the particular memory device.

In additional combinations, the set of bus lines includes (iv) a fourth subset of the plurality of bus lines connected in a point-to-point configuration between the hub and a second particular memory device in the plurality of memory devices, and the bus operation logic is configured to use at least one bus line in the fourth subset of bus lines in a fourth operation accessing the second particular memory device while using at least one bus line in the second subset of bus lines in a fifth operation accessing a different selected memory device of the plurality of memory devices, where the fourth operation overlaps in time with the fifth operation.

In another combination, the bus operation logic is configured to use at least one bus line in the fourth subset of bus lines and at least one bus line in the third subset of bus lines for a sixth operation accessing the second particular memory device.

A hub is described, which has a set of ports corresponding with the plurality of bus lines described above, and on which the bus operation logic is implemented.

Another aspect of the technology is a method of operating a memory system implementing the techniques disclosed herein.

Various other embodiments are apparent to those of ordinary skill in the art from the present document.

DETAILED DESCRIPTION

Figure 3:
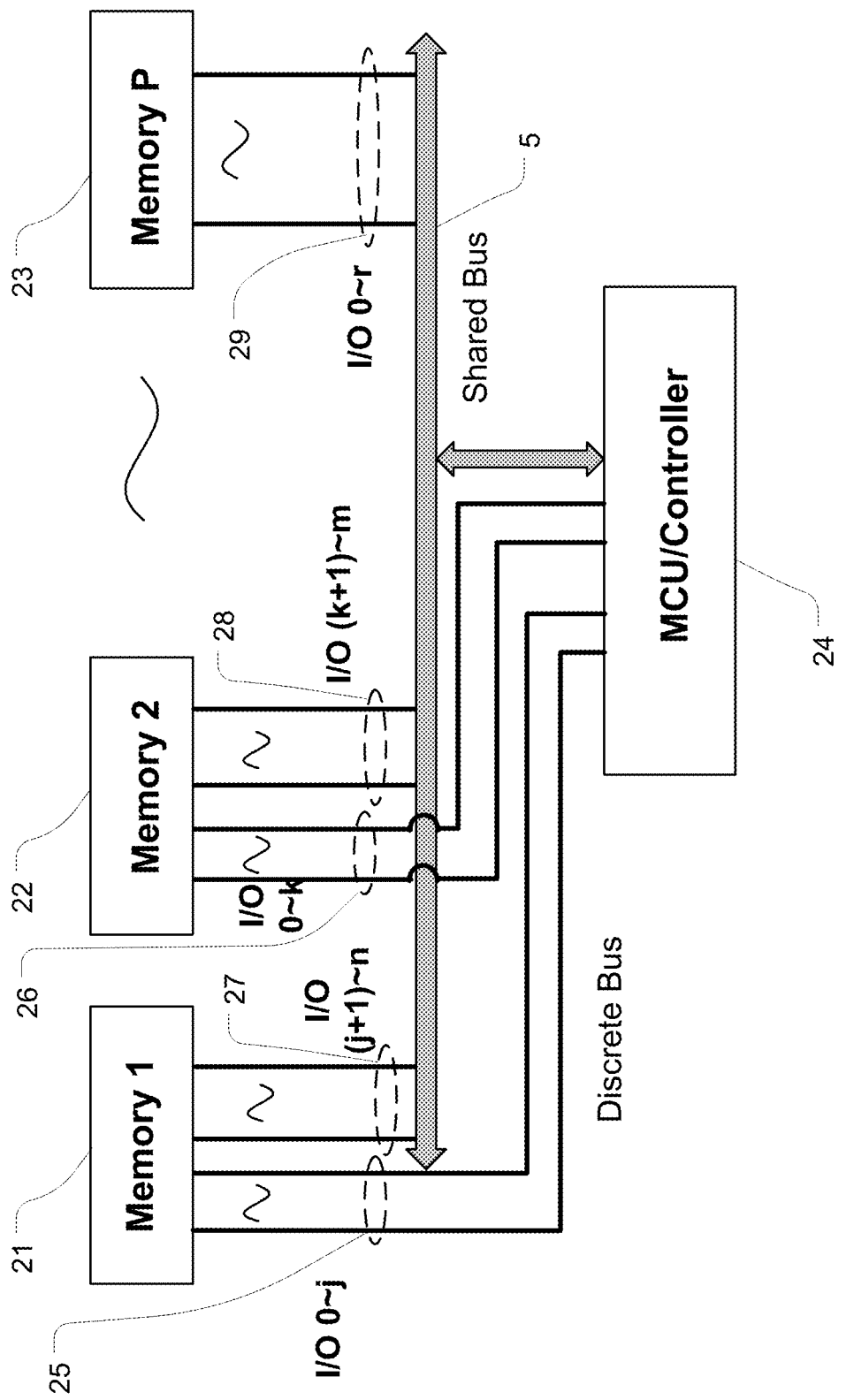
FIG. 3 is a block diagram of a memory system with both shared bus lines and discrete bus lines between a memory controller chip configured as a hub and the memory chips.

In one embodiment of the technology, FIG. 3 shows a memory system comprising a plurality of memory chips 21, 22, and 23 and a microcontroller MCU chip or memory controller chip configured as a hub 24. The hub 24 is an example of a control circuit including bus operation logic. The memory chips 21, 22, and 23 can comprise volatile and/or nonvolatile memory chips, such as RAM, ROM, NOR flash, NAND flash, and so on. Memory 1 (21) and Memory 2 (22) are different memory chips, each connected to the hub 24 via a different subsets of discrete bus lines 25 or 26 in a point-to-point configuration. Memory 1 (21) has input/output pins connected to the hub 24 via a first subset (25) of bus lines which can be logically seen as bus lines 0 to j in an operation with Memory 1; and Memory 2 (22) has input/output pins connected to the hub 24 via a different subset (26) of bus lines, which can be logically seen as bus lines 0 to k in an operation with Memory 2, and where j and k may be equal or different. Memory 1 (21) and Memory 2 (22) have input/output pins connected to a subset (27) of the shared bus lines 5, with Memory 1 (21) which can be logically seen as shared bus lines j+1 to n in an operation with Memory 1; and Memory 2 having input/output pins connected to yet another subset (28) logically seen as shared bus lines k+1 to m in an operation with Memory 2, where j and k may be equal or different, n and m may be equal or different, and the number of input/output pins connected to shared bus lines may be equal or different. In another example, the memory chip Memory P (23) has input/output pins connected to bus lines (29) which can be logically seen in an operation with Memory P as shared bus lines 0-r. In this example, Memory P (and possibly a number of other devices on the shared bus lines) does not have input/output pins connected to discrete bus lines.

Because different memory chips 21, 22, and 23 are connected to the hub 24 via different subsets 5, 25, 26, 29 of the plurality of bus lines, the hub 24 can simultaneously perform multiple operations involving data transfer between the hub and the memory devices. The hub 24 can access different memory chips 21 and 22 using the respective subsets of the discrete bus lines 25 and 26 connected to the different memory chips or a combination of the shared bus lines 5 and one or more of the discrete bus lines 25 and 26.

Figure 4:
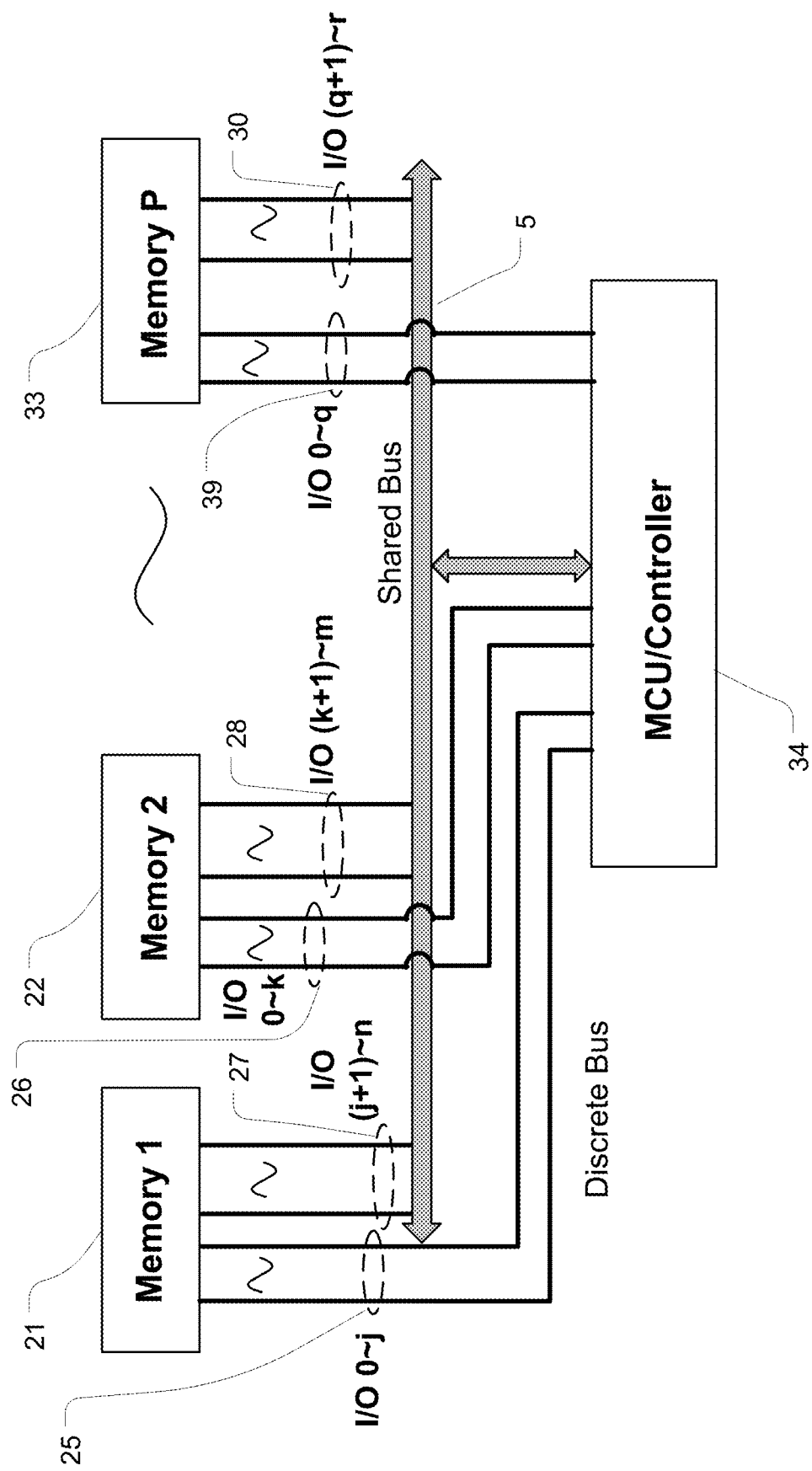
FIG. 4 is a block diagram of another memory system with both shared bus lines and discrete bus lines between the hub and the memory chips, where each of the memory chips is connected to both the shared bus lines and one or more of the discrete bus lines.

As shown in FIG. 4, in another embodiment, each memory chip 21, 22, and 33 in the system comprises I/O pins connected to the hub 34 via shared bus lines of the shared bus lines 5 and comprises I/O pins connected to the hub via discrete bus lines dedicated to the particular memory chip. FIG. 4 is similar to FIG. 3 except Memory P (33) replaces Memory P (23), along with accompanying changes in the buses and resulting changes in chips.

Memory P (33) has input/output pins connected to the hub 34 via a subset 39 of discrete bus lines which can be logically seen at Memory P as bus lines 0 to q, where q may be equal or different relative to j and k of Memory 1 (21) and Memory 2.

Memory P (33) has input/output pins connected to a subset 30 of shared bus lines 5, which can be logically seen at Memory P as bus lines q+1 to r, where q may be equal or different relative to j and k of Memory 1 and Memory 2, and where r may be equal or different relative to n and m of Memory 1 and Memory 2, and the number of input/output pins connected to shared bus lines may be equal or different.

Figure 5:
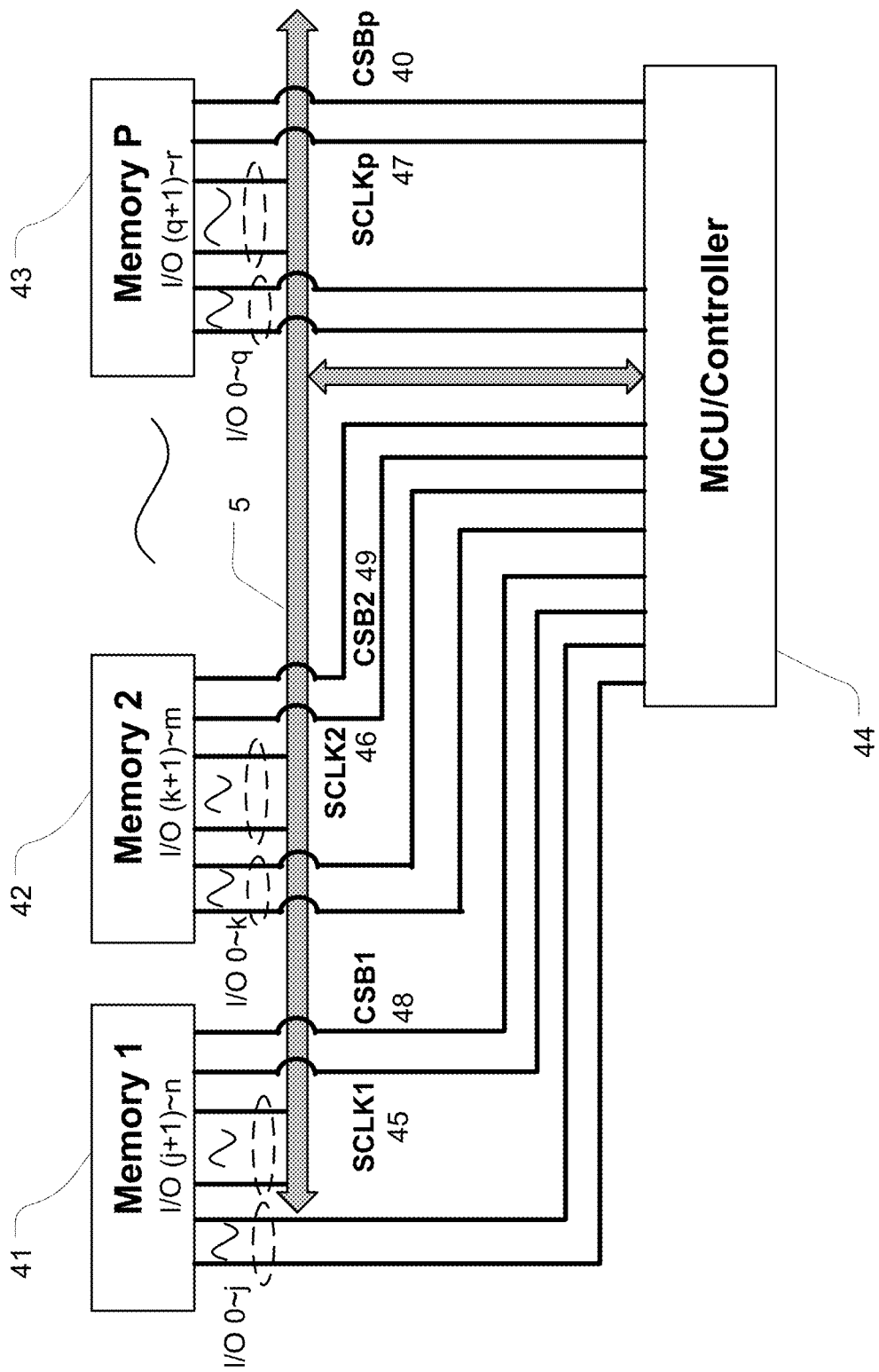
FIG. 5 is a block diagram of another memory system with both shared bus lines and discrete bus lines between the hub and the memory chips, where a discrete clock bus line is dedicated to each of the memory chips.

As shown in FIG. 5, memory chips 41, 42, and 43 and the hub 44 have pins connected to bus lines used for specialized signals, illustrated as a serial clock (SCLK1 45, SCLK2 46, and SCLKp 47) connected in a point-to-point configuration to respective serial clock pins of the memory chips and serial clock pins of the hub; and chip select signals (CSB1 48, CSB2 49, and CSBp 40) on bus lines connected in a point-to-point configuration to respective chip select pins of the respective memory chips and corresponding chip select pins of the hub 44. In one embodiment, the serial clock bus pin of each memory chip is separately connected to the hub via different discrete buses. Responsive to a memory command, the hub accesses the selected memories via the selected CSB #chip select discrete bus line. The shared bus lines 5 may not include a serial clock line in this embodiment.

Figure 6:
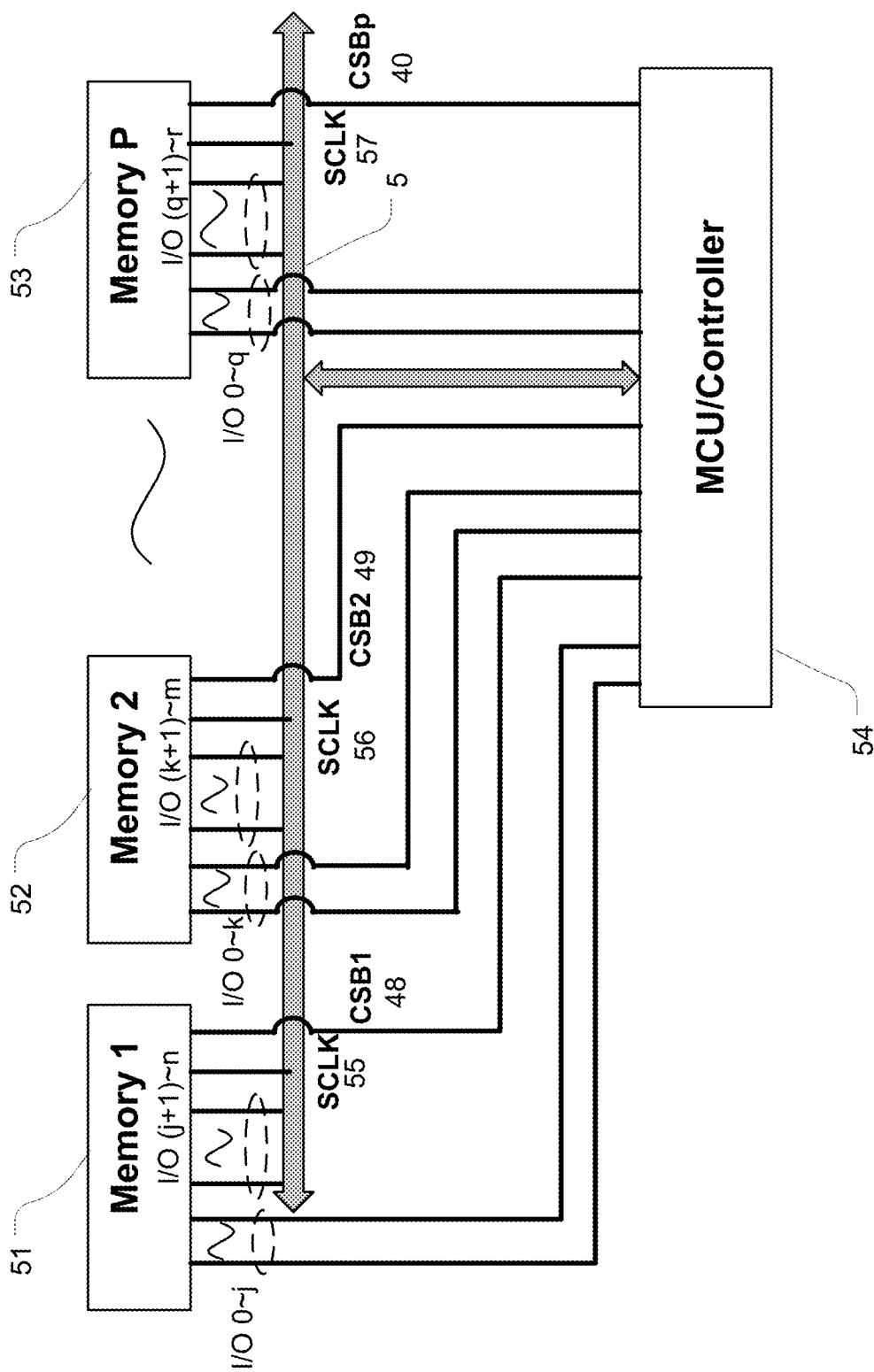
FIG. 6 is a block diagram of another memory system with both shared bus lines and discrete bus line between the hub and the memory chips, where a same system clock bus line is shared among the memory chips.

As shown in FIG. 6, in another embodiment, the respective serial clock pins SCLK 55, SCLK 56, and SCLK 57 of the respective memory chips 51, 52, and 53 are connected to one serial clock pin on the hub via one of the shared bus lines 5, which includes a serial clock line in this embodiment. However, the CSB #chip select pins of the different memory chips are still connected via different discrete bus lines to the hub 54.

Figure 7A:
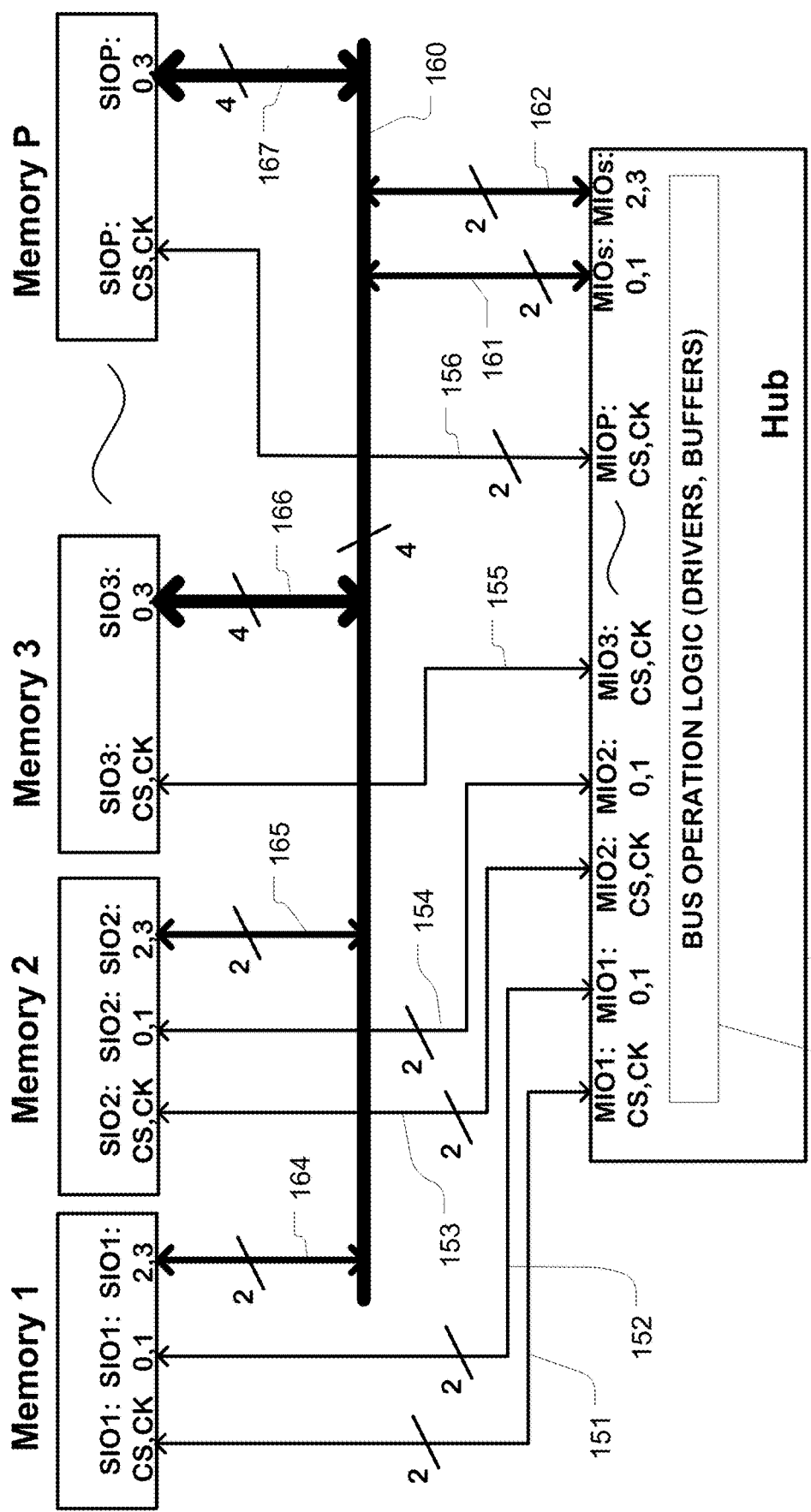
FIGS. 7A and 7B are a block diagram and a timing diagram, respectively, of a memory system with both shared bus lines and at least discrete bus lines between the hub and the memory chips, showing simultaneous memory operations being performed on different memory chips.

FIG. 7A shows an embodiment for a memory system having a plurality of memory devices (Memory 1, Memory 2, Memory 3, . . . Memory P) connected by a plurality of bus lines to a hub 150. The hub 150 as discussed above can comprise a microcontroller, a memory controller or other processor. It includes bus operation logic 159, which is configured to execute communication protocols for a bus or a number of buses used for communication with the memory devices. The bus operation logic 159 can include drivers, buffers, physical layer transmitters and receivers, and other supporting circuitry. In this example, the memory system is configured for a master/slave bus system, in which the master ports are implemented on the hub 150, and the slave ports are implemented on the memory devices.

As shown, the hub 150 includes a plurality of ports including shared ports and dedicated ports with corresponding IO pins. The shared ports in this example include MIOs:0-3. The dedicated ports on the hub 150 that are illustrated in the figure include MIO1:CS,CK,0-1; MIO2:CS,CK,0-1; MIO3:CS,CK; and MIOP:CS,CK. As represented in the illustration, there can be additional sets of ports to support additional memory devices.

Each of the memory chips includes a plurality of ports supporting its connection into the bus. Thus, Memory 1 includes ports SIO1:CS, CK, 0-3. Memory 2 includes ports SIO2:CS, CK, 0-3. Memory 3 includes ports SIO3:CS, CK, 0-3. Memory P includes ports SIOP:CS, CK, 0-3.

This configuration can be used to support buses compliant with the serial peripheral interface SPI standard bus architecture, where the port CS corresponds with the SPI active low chip select CSB, the port CK corresponds with the SPI serial clock SCLK; the port 0 corresponds with the SPI master out/slave in MOS1 port, the port 1 corresponds with the SPI first master in/slave out MISO1 port; the port 2 corresponds with the SPI second master in/slave out MISO2 port; and the port 3 corresponds with the SPI third master in/slave out MISO3 port. The technology described herein can be used with other standard and non-standard bus architectures, including for example I²C.

In FIG. 7A, an example configuration of bus lines for shared and dedicated operations is shown. In the figure, there is a plurality of bus lines which can be identified as including a number of subsets.

The ports MIOs:0-1 are connected to a subset 161 of bus lines and the ports MIOs:2-3 are connected to a subset 162 of bus lines. Subsets 161 and 162 are merged in the illustration to show merged subset 160 including four bus lines.

The subset 162 of shared bus lines is connected to the ports 2 and 3 on all of illustrated memory devices. As a result, the ports MIOs:2-3 are connected on shared lines (164, 165, 166, 167) to the ports SIO1:2-3; SIO2:2-3; SIO3:2-3 and SIOP:2-3.

The subset 161 of shared bus lines is connected to the ports 0 and 1 on some of the illustrated memory devices, including this example Memory 3 and Memory P, but not to Memory 1 and Memory 2. As a result, the ports MIOs:0-1 are connected on shared lines (subset 166, subset 167) to the ports 5103:0-1 and SIOP:0-1.

On Memory 1 and Memory 2, the ports 0 and 1 are connected to dedicated bus lines, and to corresponding dedicated ports on the hub 150. The subset 152 of the plurality of bus lines is connected in a point-to-point configuration between the ports SIO1:0,1 on Memory 1 and MIO1:0,1 on the hub 150. The subset 154 of the plurality of bus lines is connected in a point-to-point configuration between the ports SIO2:0,1 one Memory 2 and MIO2:0,1 on the hub 150.

In this example, the chip select and clock ports are connected on dedicated bus lines in point-to-point configurations. Thus, a plurality of bus lines includes subset 151 connected in a point-to-point configuration between the ports SIO1:CS, CK on memory 1, and the ports MIO1:CS, CK on the hub. Subset 153 is connected in a point-to-point configuration between the ports SIO2:CS, CK on Memory 2, and the ports MIO2:CS, CK on the hub. Subset 155 is connected in a point-to-point configuration between the ports SIO3:CS, CK on Memory 3, and the ports MIO3:CS, CK on the hub. Subset 156 is connected in a point-to-point configuration between the ports SIOP:CS, CK on Memory P, and the ports MIOP:CS, CK on the hub 150.

Figure 7B:
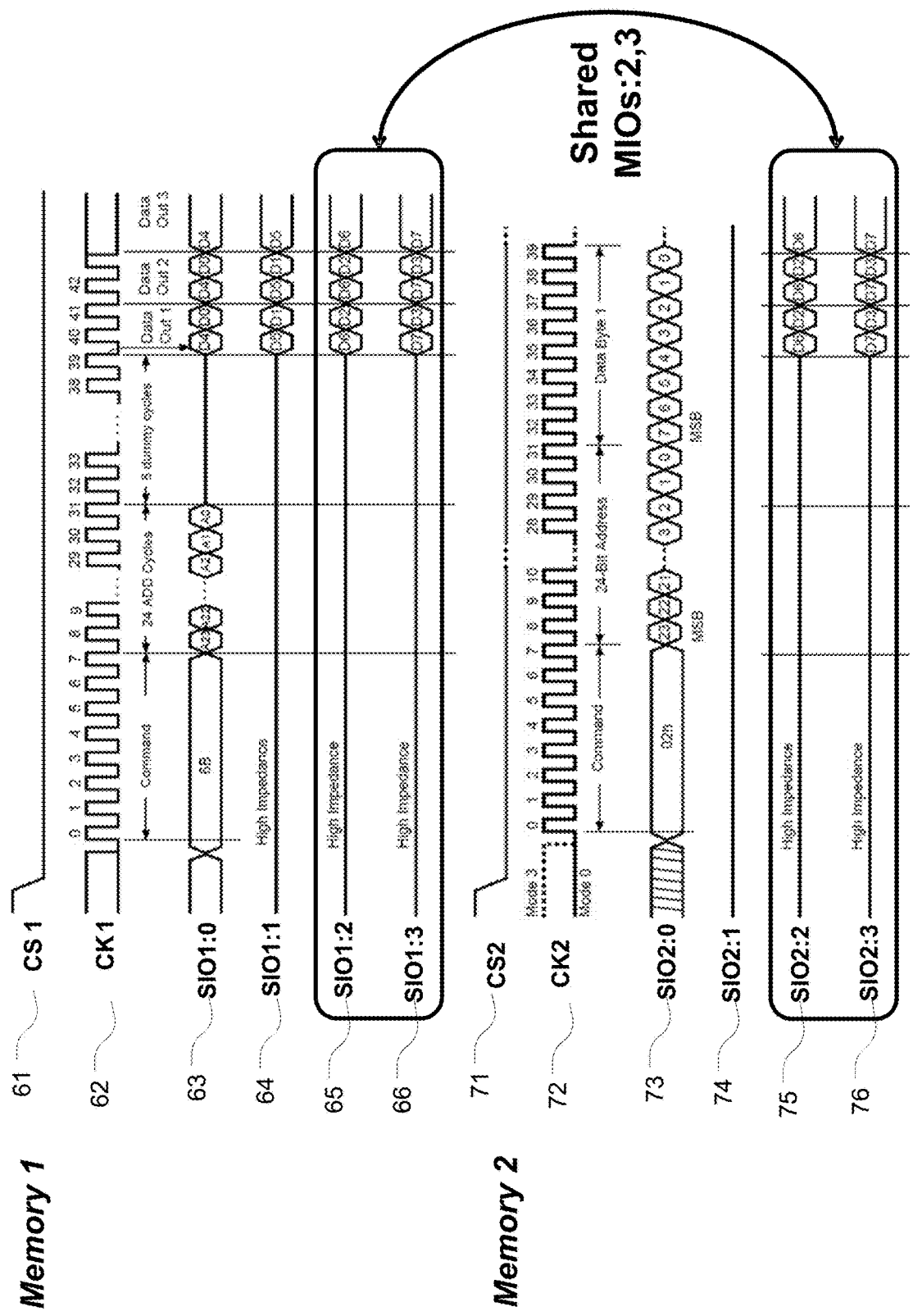

FIG. 7B illustrates the clock timing for a high throughput read accessing Memory 1 using all of its ports SIO1: CS, CK, 0-3 and a write to Memory 2 using some of its ports SIO2: CS, CK, 0-1, and in which the operations overlap in time using a system as shown in FIG. 7A, operating a synchronous serial bus like an SPI compliant bus. In this example, the operations can begin with simultaneous chip select signals, and proceed independently from the point of view of Memory 1 and Memory 2. The hub 150 coordinates the operations, through buffering and configuration logic so that the data flows that overlay in time are maintained.

In the timing diagram, the signals include for Memory 1, SIO1:0 on trace 63, SIO1:1 on trace 64, SIO1:2 on trace 65, and SIO1:3 on trace 66. For Memory 2, the signals include SIO2:0 on trace 73, SIO2:1 on trace 74, SIO2:2 on trace 75, and SIO2:3 on trace 76. As shown in FIG. 7A, the ports SIO1:2,3 and SIO2:2, 3 on Memory 1 and Memory 2 respectively are connected by shared bus lines to the ports MIOs:2,3 on the hub 150. All the other ports are connected on dedicated bus lines to dedicated ports on the hub 150.

CS1 on trace 61 and CS2 on trace 71 are chip select signals on bus ports SIO1:CS and SIO2:CS for Memory 1 and Memory 2 respectively. CK1 on trace 62 and CK2 on trace 72 are clock signals SIO1:CK and SIO2:CK for Memory land Memory 2 respectively.

As shown in the timing diagram, after respective chip select signals select the chips, CK1 and CK2 have 8 clock cycles for the command code on ports SIO1:0 and SIO2:0, respectively, and another 24 cycles for the address also on ports SIO1:0 and SIO2:0, respectively. Then, CK1 has 8 dummy clock cycles, followed by clock cycles for reading out data on all four ports SIO1:0-3. For Memory 2, CK2 has no dummy clock cycles, followed by clock cycles for receiving write data on port SIO2:0.

In other embodiments, a different number of pins connected to the shared bus lines is/are in each memory chip besides 2 pins, such as 1 pin, 3 pins, or more. In other embodiments, a different number of pins connected to discrete bus lines is/are in each memory chip besides 2 pins, such as 1 pin, 3 pins, or more. The hub may be connected to the same number of input/output pins via discrete bus lines across the different memory chips, or a different number of input/output pins via discrete bus lines across the different memory chips, or some having the same number and others with one or more different numbers of input/output pins.

In another embodiment, the simultaneous commands have a different amount of partial or complete overlap of at least part of communicating the command, the address, and the data, such that at least one cycle of the command code, address, and/or data of one command overlaps in time with at least one cycle of the command code, address, and/or data of another command.

In various embodiments, the multiple simultaneous (which may be partly overlapping) commands include at least 2 reads, at least 2 writes, or at least 1 write and 1 read.

Figure 1:
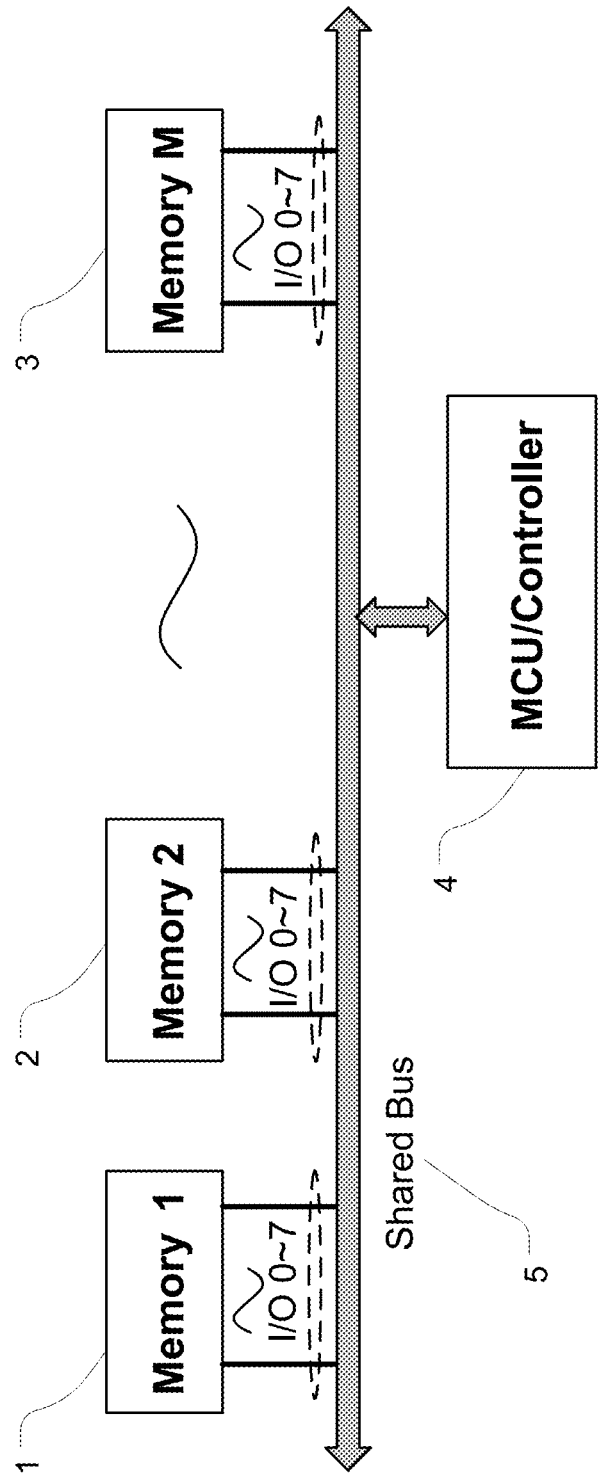
FIG. 1 is a block diagram of a prior art memory system with shared bus lines between a memory controller chip and the memory chips.
Figure 2:
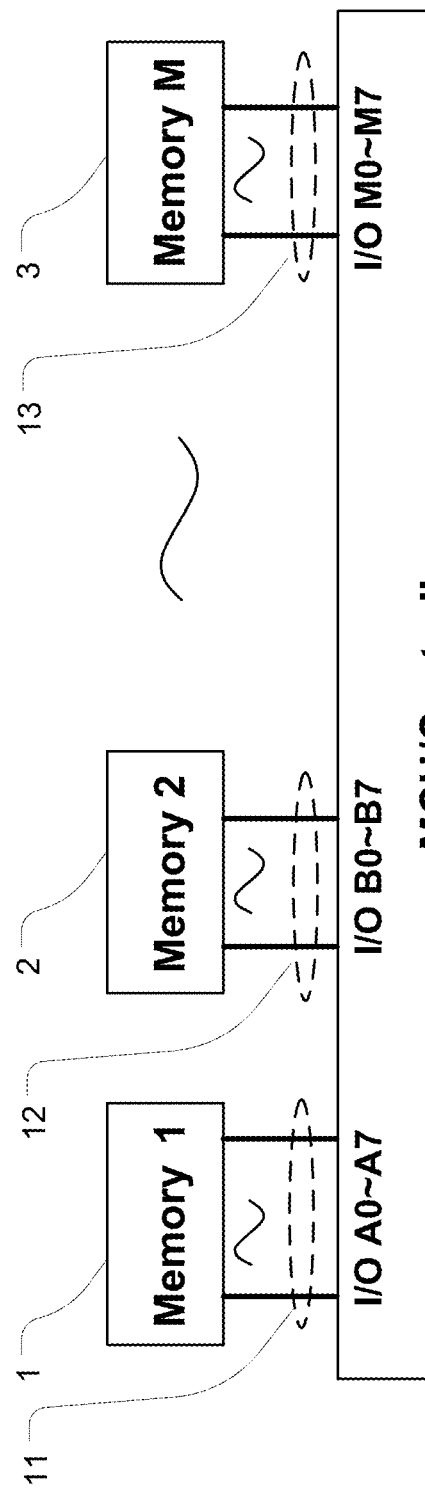
FIG. 2 is a block diagram of a prior art memory system with dedicated bus lines between a memory controller chip and each memory chip.

In various embodiments, out of all the input/output pins on a given memory chip, a first subset of the pins are connected to the hub via discrete bus lines, and a second subset of the pins are connected to the hub via shared bus lines. Because only some input/output pins of a memory chip are connected to the hub via dedicated bus lines, and fewer than every input/output pin of the memory chip is connected to the hub via dedicated bus lines, pin counts and the number of bus lines are fewer than in the case of FIG. 2. However, since at least some input/output pins of a memory chip are connected to the hub via dedicated bus lines, the hub can perform simultaneous memory operations with different chips.

Figure 8:
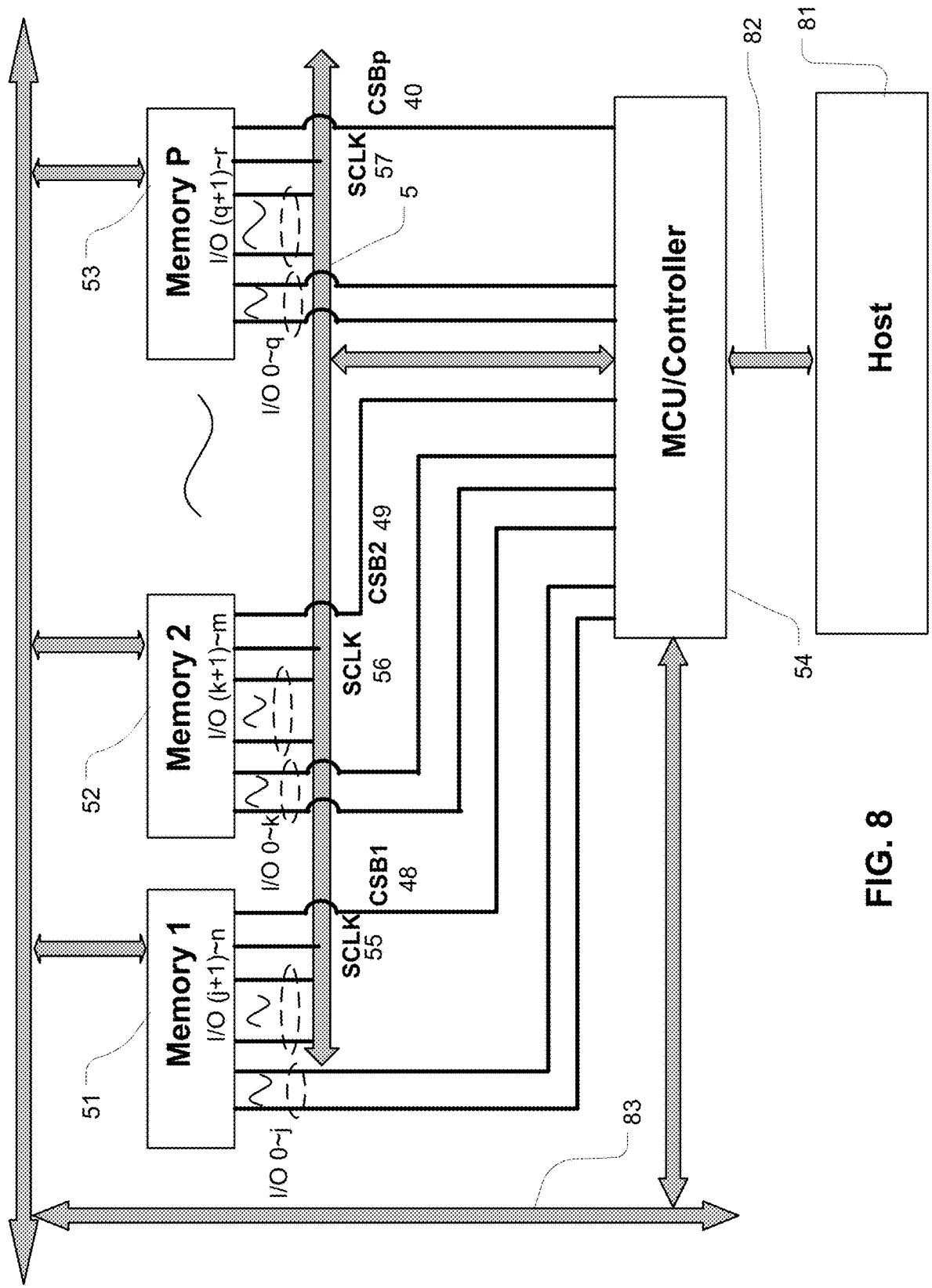
FIG. 8 is a block diagram of another memory system with both shared bus lines and discrete bus lines between the hub and the memory chips, where a power bus line is shared among the hub and the memory chips, and a host bus is between the hub and the host.

FIG. 8 is a block diagram of another memory system with both shared bus lines and at least one discrete bus line between the hub and the memory chips, where a power bus line is shared among the hub and the memory chips, and a host bus is between the hub and the host.

The memory system of FIG. 8 is similar to the memory system of FIG. 6. In addition, a host bus 82 is in between the hub 54 and a host 81. The host 81 issues commands, for example memory commands such as read, program, and erase to the hub 54, which receives the memory commands via the host bus 82 and host interface pins on hub 54. In turn, the hub 54 implements the memory commands received from the host 81 on the memory chips 51, 52, and 53. The hub 54 is an example of a control circuit.

The memory system of FIG. 8 also includes a power bus 83 with power lines connected to hub 54 and memory chips 51, 52, and 53. Example power lines in the power bus are a positive voltage reference and a ground reference, along with corresponding power pins on hub 54 and memory chips 51, 52, and 53. Another example has multiple positive voltage references. Another example has one or more negative voltage references.

Figure 9:
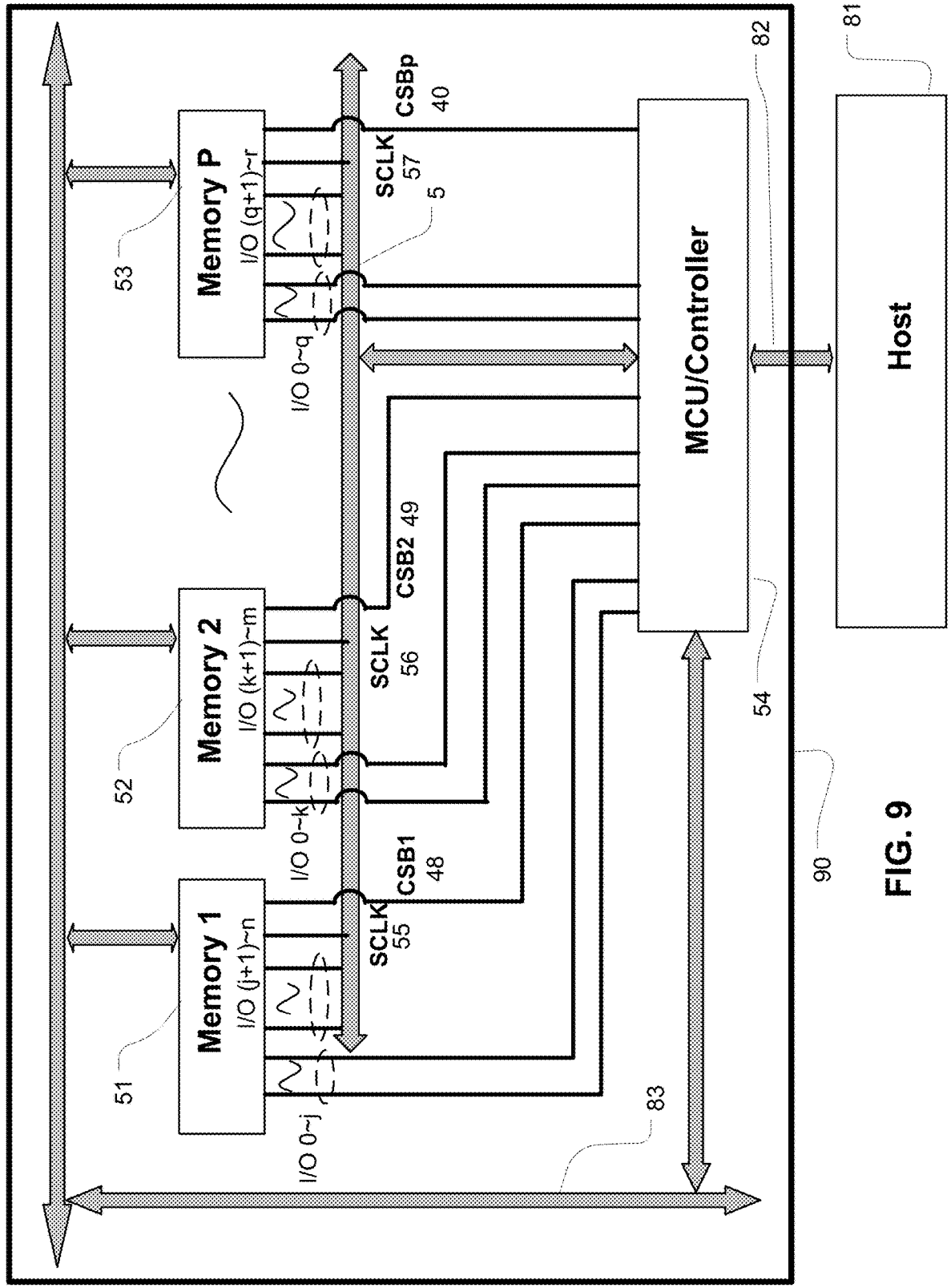
FIGS. 9 and 10 are block diagrams of another memory system with both shared bus lines and discrete bus lines between the hub and the memory chips, with the hub and the memory chips in a same package or different packages.
Figure 10:
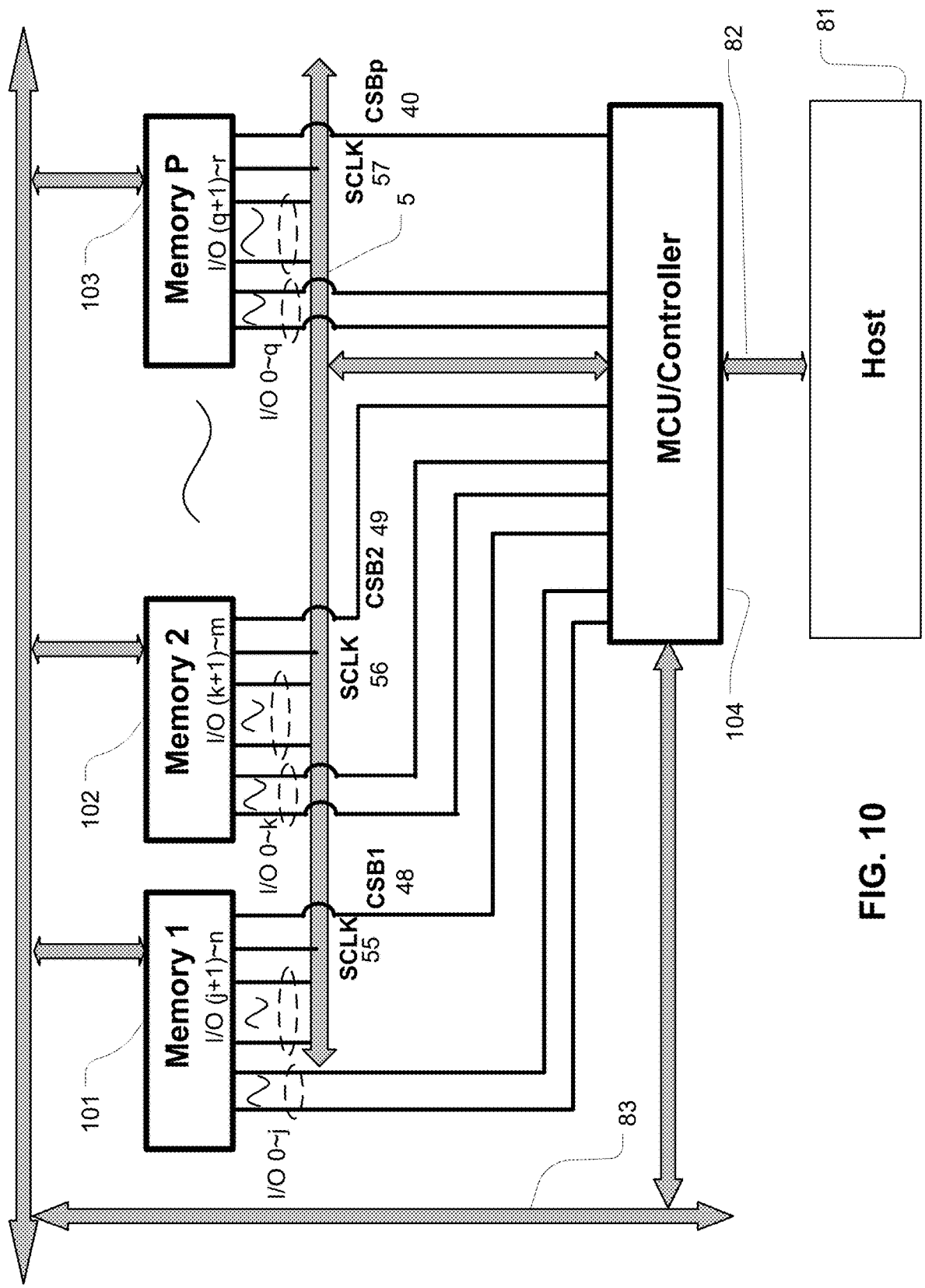

FIGS. 9 and 10 are block diagrams of another memory system with both shared bus lines and at least a discrete bus line between the hub and the memory chips, with the hub and the memory chips in a same package or different packages.

In FIG. 9, the memory system is similar to FIG. 8. However, hub 54 and memory chips 51, 52, and 53 are all in a same semiconductor package 90.

In FIG. 10, the memory system is similar to FIG. 8. However, hub 54 and memory chips 51, 52, and 53 are replaced by hub 104 and memory chips 101, 102, and 103 all in different semiconductor packages. The hub 54 is an example of a control circuit.

Figure 11:
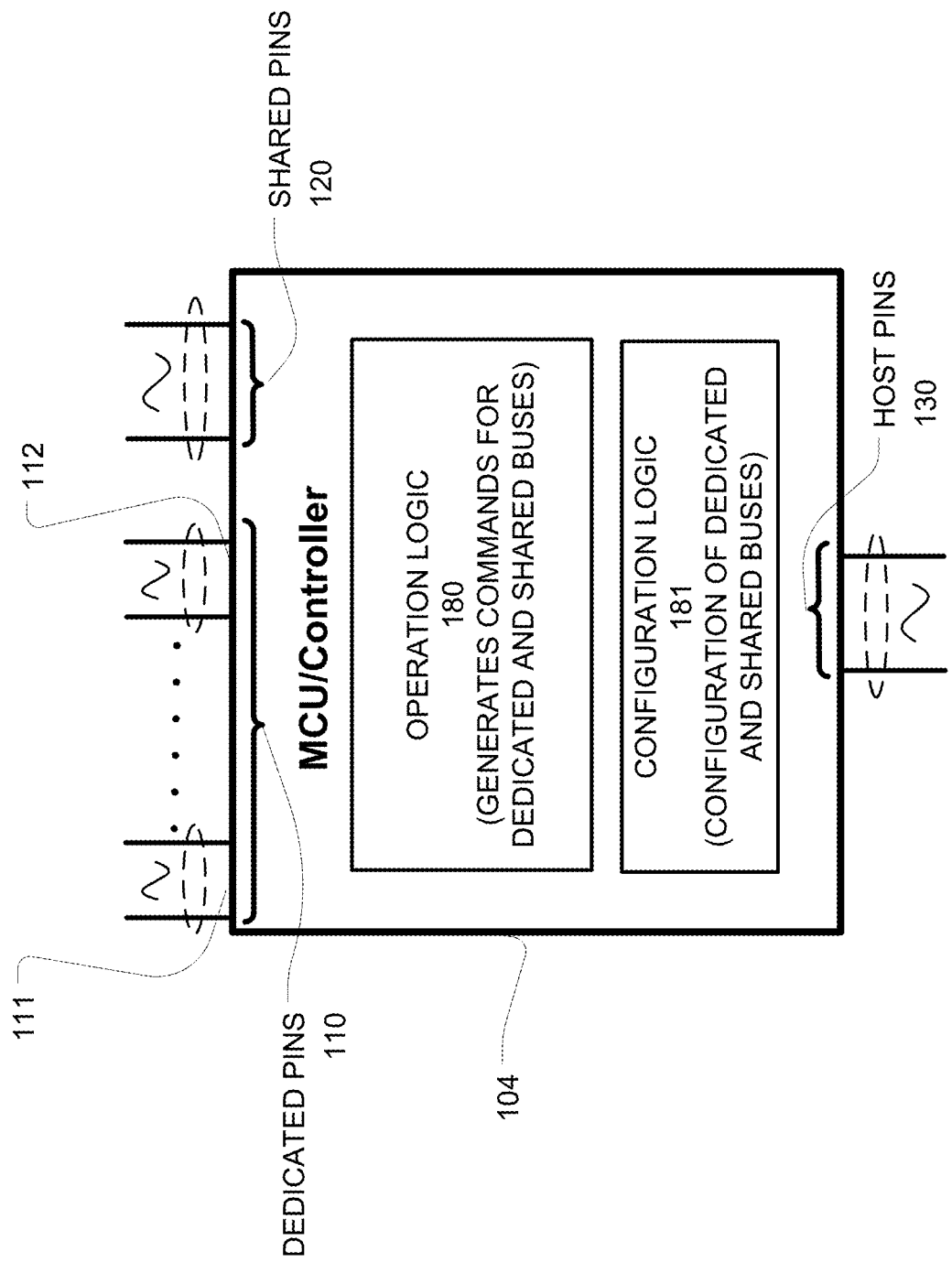
FIG. 11 is a simplified block diagram of a hub with operation logic and configuration logic.

FIG. 11 is a simplified block diagram of a hub 104 with operation logic 180 and configuration logic 181. Hub 104 also has multiple ports. Dedicated ports 110 include a first port with a first set of pins 111 and a second port with a second set of pins 112. Shared port 120 includes a third set of pins. Host port using pins 130 includes a fourth set of pins. Hub 104 also includes a set of chip select pins, a set of clock pins, and a set of power pins (not shown).

The configuration logic 181 allocates pins to communication sessions according to the needs of the bus for the particular operations being executed on the bus. Thus, given operations can require use of a configuration of the t pins 111, the pins 112, and the pins 120.

In FIG. 3, the configuration also has dedicated pins 110 connected point to point via respective dedicated bus lines to memory chips 21 and 22. FIGS. 4-6 and 8-10 have a similar configuration of dedicated pins connected point to point via a respective dedicated bus lines to respective memory device chips.

In FIG. 7A, the configuration logic 181 makes the configuration having shared ports MIOs:0-3 to be connected to shared bus lines with a subset of bus lines shared by Memory 1, Memory 2, Memory 3 and Memory P. In FIG. 7A, the configuration logic 181 makes the configuration having dedicated ports MIO1:0,1 and MIO2:0,1 etc. to be connected point to point via respective dedicated bus lines to Memory 1 and Memory 2, and so on.

The bus operation logic 180 uses the configuration to generate commands and selected pins and bus lines for operations. FIG. 7B shows an example of such commands.

Figure 12:
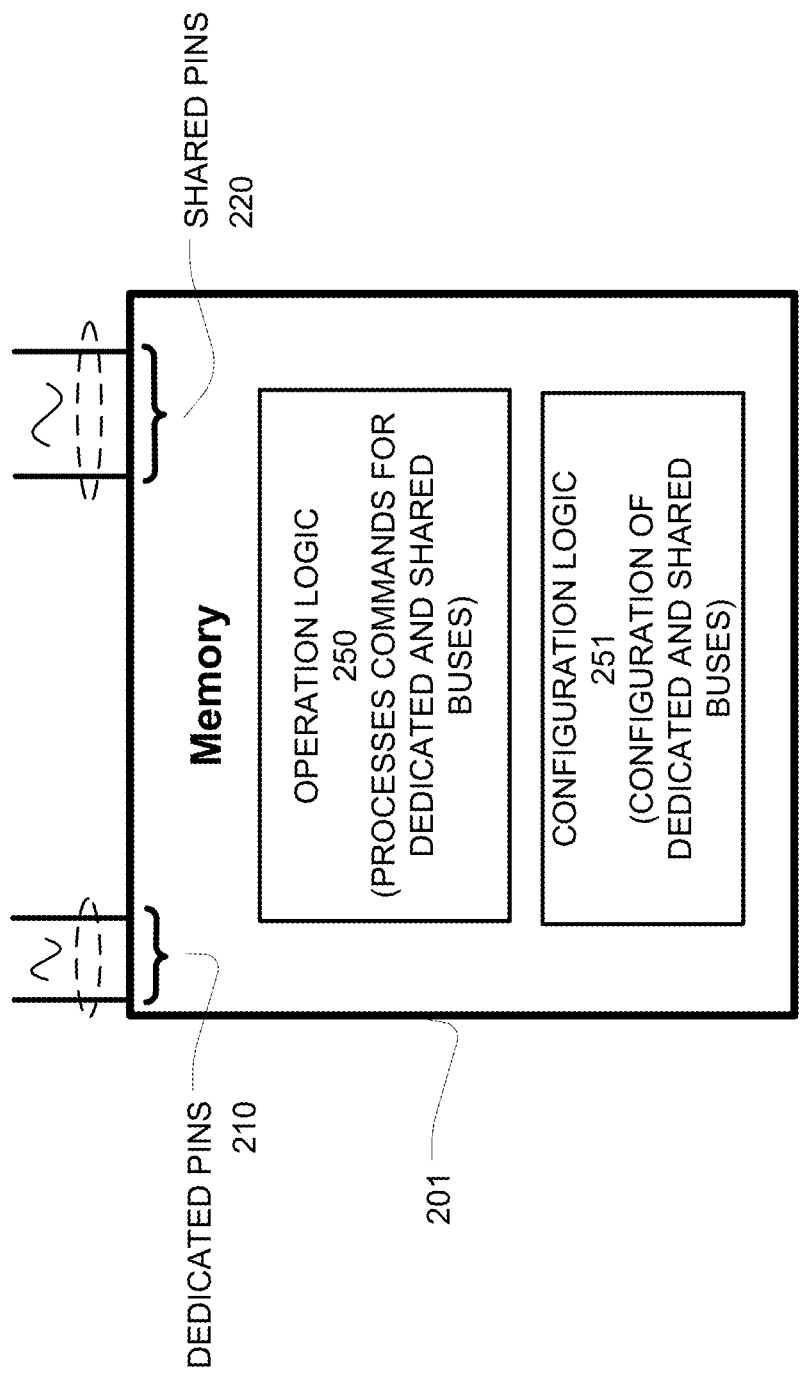
FIG. 12 is a simplified block diagram of a memory device with operation logic and configuration logic.

FIG. 12 is a simplified block diagram of a memory device chip 201 with operation logic 250 and configuration logic 251. In preferred examples, the Memory devices do not need configuration logic that distinguishes between use of shared and dedicated bus lines, as suggested by the example in FIGS. 7A and 7B. Memory device chip 201 also has multiple ports at pins for connection to bus lines. Dedicated ports 210 include a first set of pins. Shared ports 220 include a second set of pins. Memory device chip 201 also includes a chip select pin, a clock pin, and a set of power pins (not shown).

The configuration logic 251 makes a configuration with the dedicated port 210 and the shared port 220. The operation logic 250 uses the configuration to process commands for operations.

In various embodiments, the command specifies the number of pins used in operations using the memory device. The set of ports comprise synchronous serial ports configurable for operation in variant numbers of pins. For example, various commands specify a port to communicate data at 1× speed, 2× speed, 4× speed, or another speed multiple, respectively over 1 pin, 2 pins, 4 pins, or another pin multiple. Various pin distributions are all of the I/O pins in the dedicated port, all of the I/O pins in the shared port, and a combination of I/O pins in the dedicated port and I/O pins in the shared port.

One aspect of the technology is one or a plurality of the memory chips as described herein.

One aspect of the technology is a hub as described herein.

One aspect of the technology is a system such as a solid state disk or other circuit board with bus lines arranged as described herein. Various embodiments include the circuit board with or without the hub, and with or without memory integrated circuits.

Another aspect of the technology is the instructions programmed or hard wired into the hub which simultaneously performs instructions on both the shared bus lines and discrete bus lines.

Another aspect of the technology is the method performed by the hub which simultaneously sends instructions on both the shared bus lines and discrete bus lines.

In various embodiments, regarding a memory chip, the data/address paths and sequence are the same whether communication with the memory chip is via the shared bus lines or the discrete bus lines.

In various embodiments, the hub can adjust pins between ports of the shared bus lines and the discrete bus lines via firmware or software.

In various embodiments, the hub selects a memory chip on the shared bus lines with CSB, and the hub selects a memory chip on the discrete bus lines with CSB.

In various embodiments, the output driving strength of a pin is variable in case of loading on shared bus lines.

An example hub is discussed. An example hub includes one or more state machines, register files, and other logic circuitry deployed to execute the functions of the memory, including the read and program functions. An example hub is implemented using one or more dedicated logic circuits, programmable gate array circuits, a programmable processor with associated software, or combinations of these types of circuits. In some implementations, part of the hub functionality is implemented off of the memory chip, in hardware or software associated with the hub or a host processor for example. An example hub includes a command table associating command codes with the actual commands, including multiple read commands to read data out of a memory device, and/or multiple program commands to program data into a memory device. Each command includes at least a first cycle of digits to specify the command, and a later cycle including more hexadecimal digits of memory addresses. When the memory device becomes ready after confirming the memory address cycle, the hub can read out data from the memory device in sequence.

An example hub uses an industry standard serial peripheral interface SPI bus master for a serial flash using an SPI serial interface. Other example functions are wear leveling and a translation layer between the host file system and physical memory addresses.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims. What is claimed is:

What is claimed is:

1. A hub comprising:
   a set of ports including a plurality of ports; and
   bus operation logic configured to use a first subset of ports, including one or more ports of the set of ports, configured for point-to-point connections to a particular memory device in a first operation accessing the particular memory device while using a second subset of ports, including one or more ports of the set of ports, configured for shared connections to a plurality of memory devices in a second operation accessing a different selected memory device of the plurality of memory devices, where the first operation overlaps in time with the second operation, at least one port in the second subset of ports and at least one port in the first subset of ports being different ports.

2. The hub of claim 1, wherein the ports in the first subset of ports include a first port configured for sending data from the first port to the particular memory device and a second port configured for sending data from the particular memory device to the second port.

3. The hub of claim 1, wherein:
   (i) the second subset of ports are configured for connections to a plurality of memory devices including the particular memory device; and
   (ii) a third subset of ports, including one or more ports of the set of ports, are configured for shared connections to more than one of the plurality of memory devices excluding the particular memory device.

4. The hub of claim 3, wherein the bus operation logic is configured to use at least one port in the first subset of ports for the first operation, and to use at least one port in the second subset of ports and at least one port in the third subset of ports for the second operation.

5. The hub of claim 3, wherein the bus operation logic is configured to use at least one port in the first subset of ports and at least one port in the third subset of ports for a fourth operation accessing the particular memory device.

6. The hub of claim 3, wherein the set of ports, includes a fourth subset of ports, including one or more ports of the set of ports, for connection to bus lines configured for point-to-point connections to a second particular memory device in the plurality of memory devices; and
   the bus operation logic is configured to use at least one port in the fourth subset of ports in a fourth operation accessing the second particular memory device while using at least one port in the second subset of ports in a fifth operation accessing a different selected memory device of the plurality of memory devices, where the fourth operation overlaps in time with the fifth operation.

7. The hub of claim 6, wherein the bus operation logic is configured to use at least one port in the fourth subset of ports and at least one port in the third subset of ports for a sixth operation accessing the second particular memory device.

8. A memory system comprising:
   a plurality of memory devices;
   a hub;
   a plurality of bus lines connecting the plurality of memory devices to the hub, including a first subset of bus lines, including one or more bus lines in the plurality of bus lines, configured for point-to-point connections to a particular memory device in the plurality of memory devices, and a second subset of bus lines, including one or more bus lines in the plurality of bus lines, configured for shared connections to all the memory devices in the plurality of memory devices including the particular memory device; and
   the hub including bus operation logic configured to use the first subset of bus lines in a first operation accessing the particular memory device while using the second subset of bus lines in a second operation accessing a different selected memory device of the plurality of memory devices, where the first operation overlaps in time with the second operation, at least one bus line in the second subset of bus lines and at least one bus line in the first subset of bus lines being different bus lines.

9. The memory system of claim 8, wherein bus lines in the first subset of bus lines include a first bus line configured for sending data from the hub to the particular memory device and a second bus line configured for sending data from the particular memory device to the hub.

10. The memory system of claim 8, the plurality of bus lines including:
    a third subset of bus lines, including one or more bus lines are configured for shared connections to more than one of the plurality of memory devices excluding the particular memory device.

11. The memory system of claim 10, wherein the bus operation logic is configured to use at least one bus line in the first subset of bus lines for the first operation, and to use at least one bus line in the second subset of bus lines and at least one bus line in the third subset of bus lines for the second operation.

12. The memory system of claim 10, wherein the plurality of bus lines includes a fourth subset of bus lines, including one or more bus lines of the plurality of bus lines, connected in a point-to-point configuration between the hub and a second particular memory device in the plurality of memory devices; and
    the bus operation logic is configured to use at least one bus line in the fourth subset of bus lines in a fourth operation accessing the second particular memory device while using at least one bus line in the second subset of bus lines in a fifth operation accessing a different selected memory device of the plurality of memory devices, where the fourth operation overlaps in time with the fifth operation.

13. The memory system of claim 12, wherein the bus operation logic is configured to use at least one bus line in the fourth subset of bus lines and at least one bus line in the third subset of bus lines for a sixth operation accessing the second particular memory device.

14. A method of operating a memory system including a plurality of memory devices, a hub and a plurality of bus lines connecting the plurality of memory devices to the hub, including a first subset of bus lines, including one or more bus lines in the plurality of bus lines, configured for point-to-point connections to a particular memory device in the plurality of memory devices, and a second subset of bus lines, including one or more bus lines in the plurality of bus lines, configured for shared connections to a plurality of memory devices including the particular memory device; the method comprising:

using the first subset of bus lines in a first operation accessing the particular memory device while using the second subset of bus lines in a second operation accessing a different selected memory device of the plurality of memory devices, where the first operation overlaps in time with the second operation.

15. The method of claim 14, wherein the first and second operations include transferring data.

16. The method of claim 14, the plurality of bus lines including:

a third subset of bus lines, including one or more bus lines configured for shared connections to more than one of the plurality of memory devices excluding the particular memory device, and including:

using at least one bus line in the first subset of bus lines for the first operation; and using at least one bus line in the second subset of bus lines and at least one bus line in the third subset of bus lines for the second operation.

17. The method of claim 14, the plurality of bus lines including:

a third subset of bus lines, including one or more bus lines configured for shared connections to more than one of the plurality of memory devices excluding the particular memory device, and including:

using at least one bus line in the first subset of bus lines and at least one bus line in the third subset of bus lines for a fourth operation accessing the particular memory device.

18. The method of claim 14, the plurality of bus lines including:

a third subset of bus lines, including one or more bus lines in the plurality of bus lines configured, for shared connections to more than one of the plurality of memory devices excluding the particular memory device; and a fourth subset of bus lines, including one or more bus lines in the plurality of bus lines, connected in a point-to-point configuration between the hub and a second particular memory device in the plurality of memory devices; and including:

using at least one bus line in the fourth subset of bus lines in a fourth operation accessing the second particular memory device while using at least one bus line in the second subset of bus lines in a fifth operation accessing a different selected memory device of the plurality of memory devices, where the fourth operation overlaps in time with the fifth operation.

19. The method of claim 18, including using at least one bus line in the fourth subset of bus lines and at least one bus line in the third subset of bus lines for a sixth operation accessing the second particular memory device.

\* \* \* \* \*